(12) United States Patent
Sareday et al.

(10) Patent No.: US 7,647,352 B2
(45) Date of Patent: Jan. 12, 2010

(54) ONLINE DELIVERY PLATFORM AND METHOD OF LEGACY WORKS OF AUTHORSHIP

(75) Inventors: Seshukumar Sareday, San Jose, CA (US); Supra Manohar, San Jose, CA (US); Sriram Somanchi, Fremont, CA (US); Vijay Ananth, Chennai (IN)

(73) Assignee: Emantras, Inc., Fremont, CA (US)

( * ) Notice: Subject to any disclaimer, the term of this patent is extended or adjusted under 35 U.S.C. 154(b) by 195 days.

(21) Appl. No.: 11/545,969

(22) Filed: Oct. 10, 2006

(65) Prior Publication Data

US 2008/0016064 A1   Jan. 17, 2008

(51) Int. Cl.
*G06F 17/30* (2006.01)

(52) U.S. Cl. .................... 707/104.1; 707/100; 707/101; 707/102; 707/9; 707/3

(58) Field of Classification Search ................. 707/1–3, 707/8–10, 100–104.1; 705/51, 52, 59; 713/200; 341/50

See application file for complete search history.

(56) References Cited

U.S. PATENT DOCUMENTS

| | | | |
|---|---|---|---|
| 6,983,322 B1 * | 1/2006 | Tripp et al. | 709/225 |
| 7,236,966 B1 * | 6/2007 | Jackson et al. | 707/1 |
| 2002/0194480 A1 * | 12/2002 | Nagao | 713/176 |
| 2003/0126086 A1 * | 7/2003 | Safadi | 705/51 |
| 2004/0167905 A1 * | 8/2004 | Eakin | 707/100 |
| 2007/0047813 A1 * | 3/2007 | Simske et al. | 382/176 |
| 2007/0099161 A1 * | 5/2007 | Krebs et al. | 434/322 |

* cited by examiner

*Primary Examiner*—Cam-Linh Nguyen
(74) *Attorney, Agent, or Firm*—Raj Abhyanker LLP (57) ABSTRACT

An online delivery platform and/or method of works of authorship is disclosed. In one embodiment, a method includes automatically creating index data referencing segment data of a native markup language file using a dynamic index algorithm. In addition, the method includes storing the index data and the native markup language file in a digital content module of the online delivery platform and accessing at least one of the segment data when a query data generated by a user of the digital content module matches with any one of the index data. The method may also include generating a master index to streamline multiple index data when multiple native markup language files are processed. The method may further include generating a compilation markup language file using a style-sheet based on at least one format analysis of multiple segment data of the compilation markup language file.

3 Claims, 10 Drawing Sheets

| USER NAME | ORGANIZATION NAME | PRIVILEGE LEVEL | PRIVILEGED CONTENT | PRIVILEGED ACTIVITY | COMMENT |
|---|---|---|---|---|---|
| JOHN DEAR | HUGE PUBLISHING | 1 | ALL COLLECTIONS | ● READ<br>● WRITE<br>● EDIT<br>● PUBLISH<br>● OTHER | CHIEF EDITOR |
| JAKE CASH<br>DALE KIM<br>JILL BUSH | IVY UNIVERSITY PRESS | 2 | COLLEGE TEXTBOOK COLLECTION | ● READ<br>○ WRITE<br>● EDIT<br>● PUBLISH<br>○ OTHER | GENERAL MANAGER<br>OFFICE MANAGER<br>CHIEF EDITOR |
| JANE DOE<br>TOM KANE<br>BOB LENO | FEDERAL BUREAU OF ANTI-TERRORISM | 3 | TERRORISM COLLECTION | ● READ<br>○ WRITE<br>● EDIT<br>○ PUBLISH<br>○ OTHER | TERRORISM EXPERT & TRAINER |
| KYLE PADILLA | INDIVIDUAL | 4 | AUTOMOBILE MECHANIC HANDBOOK VOLUME 1 | ● READ<br>○ WRITE<br>○ EDIT<br>○ PUBLISH<br>○ OTHER | NONE |
| ● ● ● | ● ● ● | ● ● ● | ● ● ● | ● ● ● | ● ● ● |

502 USER NAME · 504 ORGANIZATION NAME · 506 PRIVILEGE LEVEL · 508 PRIVILEGED CONTENT · 510 PRIVILEGED ACTIVITY · 512 COMMENT · PRIVILEGE TABLE 414

ONLINE DELIVERY PLATFORM AND METHOD OF LEGACY WORKS OF AUTHORSHIP

FIELD OF TECHNOLOGY

This disclosure relates generally to the technical fields of software and/or hardware technology and, in one example embodiment, to an online delivery platform and/or method of works of authorship.

BACKGROUND

A non-digital document (e.g., legacy work) may be transformed (e.g., manually or electronically) to a digital document (e.g., in XML, HTML, and/or other digital format). A compiled digital document may be produced when multiple segments of multiple digital documents are put together (e.g., based on a category, such as a subject area of interest).

A process of compiling the multiple segments of multiple non-digital documents to create the compiled digital document may require several steps including converting (e.g., manually and/or electronically) the multiple non-digital documents to electronic files (e.g., in a native form, such as a DocBook format, a native XML, etc.), encrypting a plurality of metadata associated with contents of the electronic files (e.g., through putting tags on the contents) to create markup language files (e.g., XML, HTML, SGML, etc), and/or indexing segments of the markup language files (e.g., through linking the segments with one and/or more of index data).

Encrypting the plurality of metadata may require a lot of repetitive manual labor and time because the tags and/or other metadata have to be entered (e.g., typed) strategically between the contents of the electronic files. The tags and/or the other metadata may be selected (e.g., informally and/or personally by a creator of the digital document) because there may be no defined classification scheme. Thus, the tags and/or the other metadata may be difficult to replace (e.g., through modifying the tags and/or the metadata) even if a search through the markup language files using a query data (e.g., based on one or more of key terms) may return irrelevant data (i.e., owing to the tags and/or the other metadata informally and/or personally selected among the markup language files).

Furthermore, access to the segments of the markup language files may be hindered (e.g., taking longer to access and/or returning irrelevant data) because an application program (e.g., a database management software) may not be equipped to deal competently (e.g., with a minimal error rate and/or a delay time) with markup language files having a variety of schemes to encrypt (e.g., and/or decipher) tags and/or other metadata (e.g., where a standard industry format may not have been established, yet).

SUMMARY

An online delivery platform and/or method of works of authorship are disclosed. In one aspect, a method of a content platform includes fetching a dynamic index algorithm of a digital content module when a native markup language file (e.g., a native XML file) and a format data (e.g., containing an indexing scheme of the native markup language file) of the native markup language file associated with the dynamic index algorithm are processed in the digital content module.

The method also includes automatically creating a plurality of index data referencing a plurality of segment data of the native markup language file using the dynamic index algorithm (e.g., which automatically links each of the plurality of segment data with at least one of the plurality of index data based on the indexing scheme). In addition, the method includes storing the plurality of index data and the native markup language file in the digital content module and accessing at least one of the plurality of segment data when a query data (e.g., in a natural and/or an artificial language) generated by a user of the digital content module matches with any one of the plurality of index data.

The method may also include generating a master index to streamline multiple ones of the plurality of index data when multiple ones of the native markup language file are processed. The method may further include generating a compilation markup language file fetching multiple ones of the segment data based on the multiple ones of the native markup language file when the query data matches with any one of the multiple ones of the plurality of index data referencing the multiple ones of the segment data.

Moreover, the method may include generating the compilation markup language file using a style-sheet (e.g., fitting for a textbook, a novel, a financial document, etc.) based on at least one format analysis of the multiple ones of the segment data of the compilation markup language file. The method may further include controlling an access to the digital content module via assigning one of layered privileges (e.g., which allow a partial and/or a full usage) to a user of the digital content module.

The method may also include offering a portal focusing on a specific subject based on the multiple ones of the segment data generated in the content platform, integrating multiple ones of the portal focusing on the specific subject to build a universal portal (e.g., which may offer one-stop shopping of information), and/or generating an on-line delivery content (e.g., an on-line course, an on-line assignment, etc) based on the master index and the multiple ones of the native markup language file.

In another aspect, a method of a content provider (e.g., which may process a plurality of documents of a copyright holder and/or a licensee) includes communicating a plurality of native markup language files individually described by a format data to a native database management program (e.g., the digital content module) generating a plurality of index data with each of the plurality of index data referencing at least one segment data of the native markup language files and automatically providing through a content subscriber a compilation markup language file aggregating multiple segment data when a query data matches with at least one of the plurality of index data referencing the multiple segment data.

The method of the content provider may further include converting a plurality of documents to the plurality of native markup language files using a conversion module. The method may further include automatically generating the format of each of the plurality of native markup language files using a format generator module.

In yet another aspect, a system includes a content provider module to provide a digital file (e.g., in a XML, SGML, DocBook, and/or etc.) based on multiple segments of a plurality of native markup language files communicated to a digital content module. The system also includes a content platform having the digital content module to generate a plurality of index data referencing a plurality of segment data of the plurality of native markup language files using at least one on-the-fly indexing algorithm (e.g., the at least one on-the-fly indexing algorithm is based on a tagless indexing scheme) based on a format of each of the plurality of native markup language files. The system further includes a content subscriber (e.g., which generates the query data in a query module of the content subscriber and processes the digital file in the content subscriber when a command data to retrieve the digital file associated with the query data is communicated to the content subscriber) coupled to the content platform to process the digital file when a query data of the content subscriber matches with at least one of the plurality of index data referencing the multiple segments of the plurality of native markup language files.

In addition, the system may include a management module of the content platform to provide a user with a layered access to the plurality of index data and the plurality of native markup language files when the content provider communicates a privilege data of the user to the management module. The system further includes a portable library device (e.g., based on EEPROM, Flash memory, and/or other memory) to store the plurality of index files and the plurality of native markup language files when the user obtains a license from the copyright holder.

The methods, systems, and devices disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Other features of the present embodiments will be apparent from the accompanying drawings and from the detailed description that follows.

DETAILED DESCRIPTION

An online delivery platform and/or method of works of authorship are disclosed. In the following description, for purposes of explanation, numerous specific details are set forth in order to provide a thorough understanding of the various embodiments. It will be evident, however, to one skilled in the art that the various embodiments may be practiced without these specific details.

Figure 1:
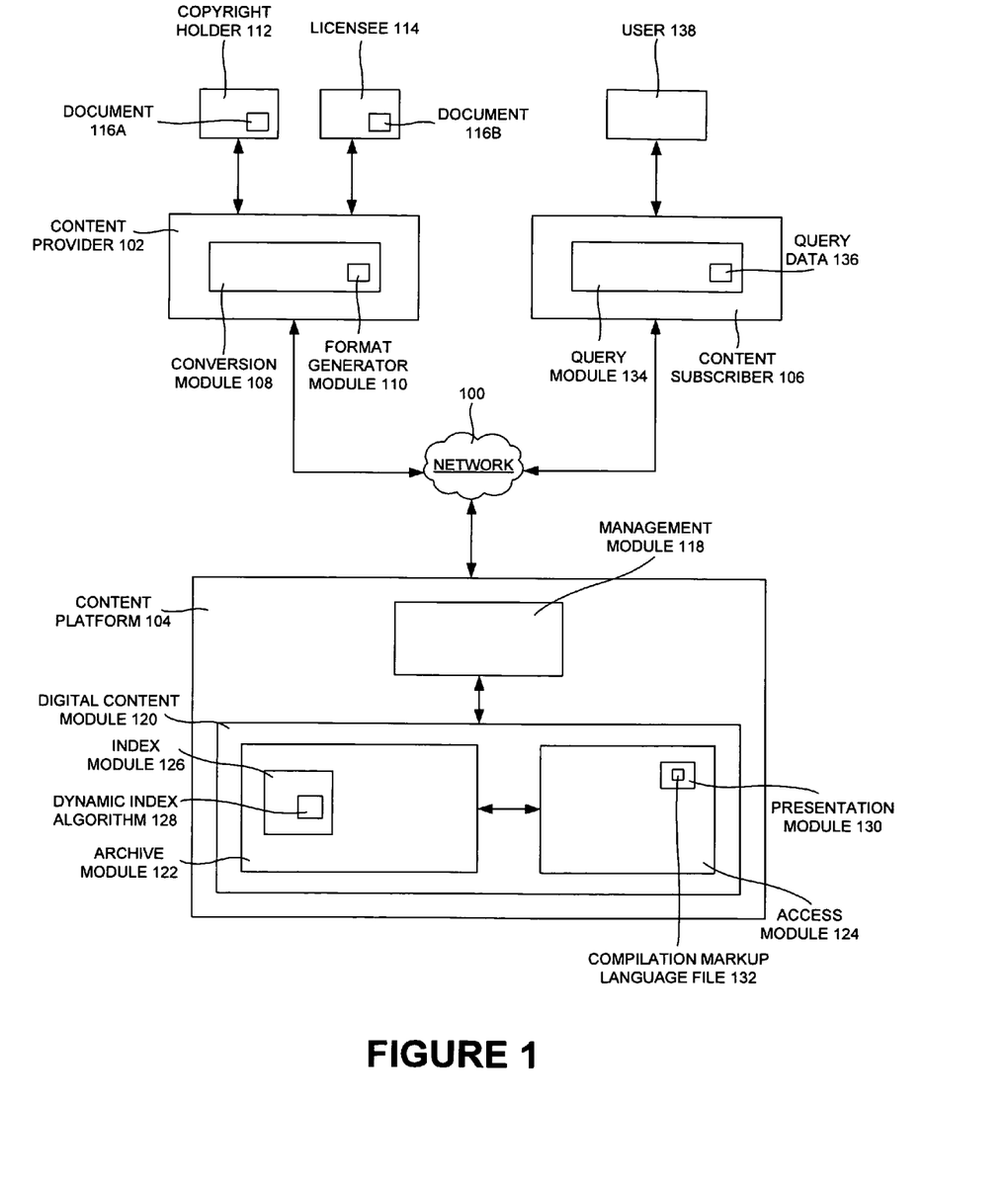
FIG. 1 is a system view of a content platform connected to a content provider and a content subscriber through a network, according to one embodiment.
Figure 4:
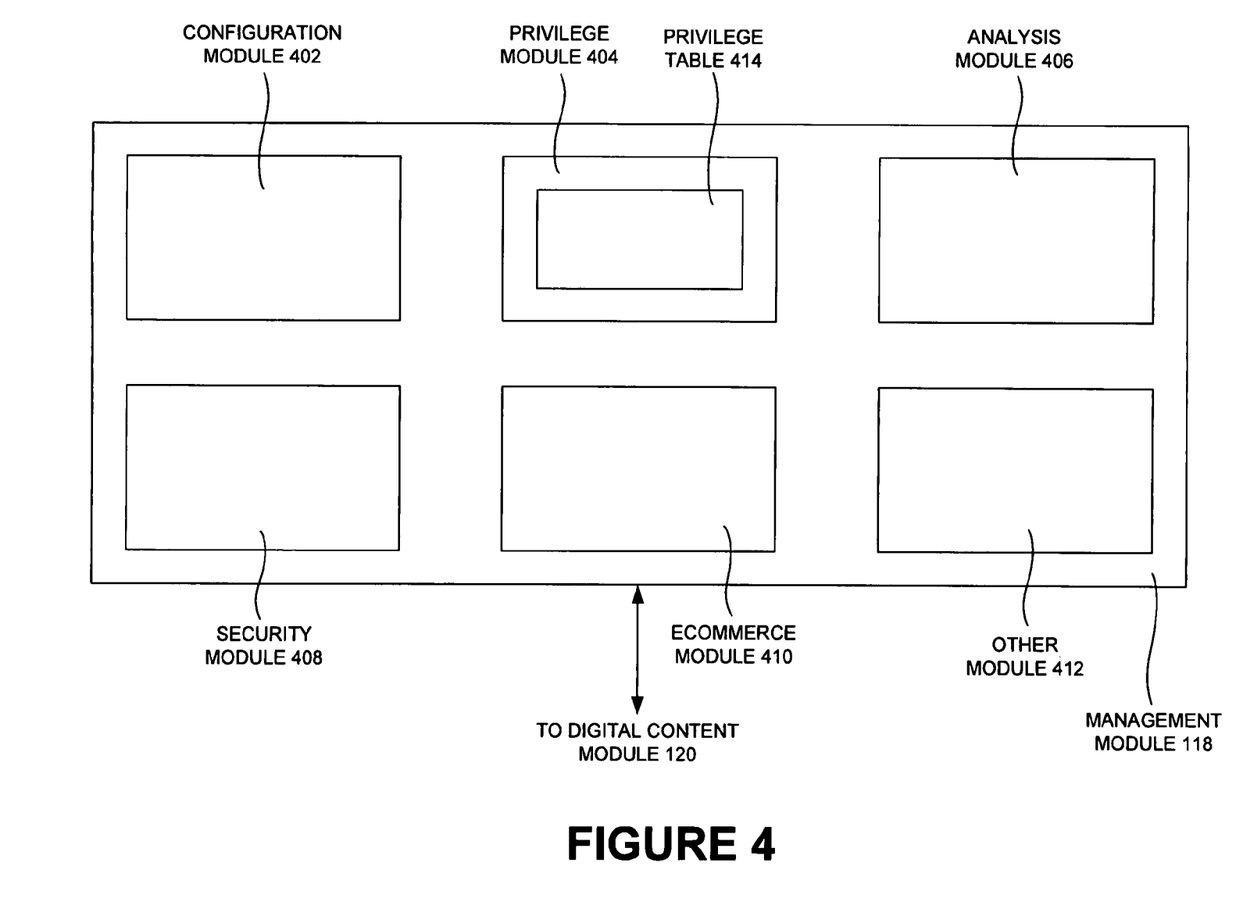
FIG. 4 is an exploded view of the management module of FIG. 1, according to one embodiment.

In one embodiment, a method of a content platform (e.g., a content platform 104 of FIG. 1) includes creating a list of index (e.g., a master index 216 of FIG. 1) using a dynamic index algorithm (e.g., a dynamic index algorithm 128 of FIG. 1) when an electronic file (e.g., a native markup language file 204 of FIG. 2) is processed in a digital content module (e.g., a digital content module 120 of FIG. 1). The method also includes accessing (e.g., retrieving, rearranging, publishing, etc.) various segments of the electronic file using the list of index (e.g., the master index 216 as illustrated in FIG. 4).

Also, the method may be in a form of a machine-readable medium embodying a set of instructions that, when executed by a machine, cause the machine to perform any method disclosed herein. It will be appreciated that the various embodiments discussed herein may/may not be the same embodiment, and may be grouped into various other embodiments not explicitly disclosed herein.

In another embodiment, a method of a content provider (e.g., a content provider 102 of FIG. 1) includes communicating (e.g., downloading and/or uploading) files (e.g., in an electronic form) to a native database management program (e.g., e.g., the digital content module 120 of FIG. 1) to index the files. The method further includes providing a compilation file (e.g., a compilation markup language file 132 of FIG. 1) aggregating multiple segments of the files (e.g., which shares a common linkage) upon a request (e.g., contained in a query data) of a client to the content provider (e.g., the content provider 102 as illustrated in FIG. 4).

In yet another embodiment, a system includes a content provider (e.g., the content provider 102 of FIG. 1) to provide a client (e.g., a user 138 of FIG. 1) digital files (e.g., compiled digital files and/or non-compiled digital files) based on one and/or more files (e.g., documents, books, etc. in a printed form and/or a non-printed form) communicated to a native database management program (e.g., which automatically indexes parts of the one or more files).

Figure 2:
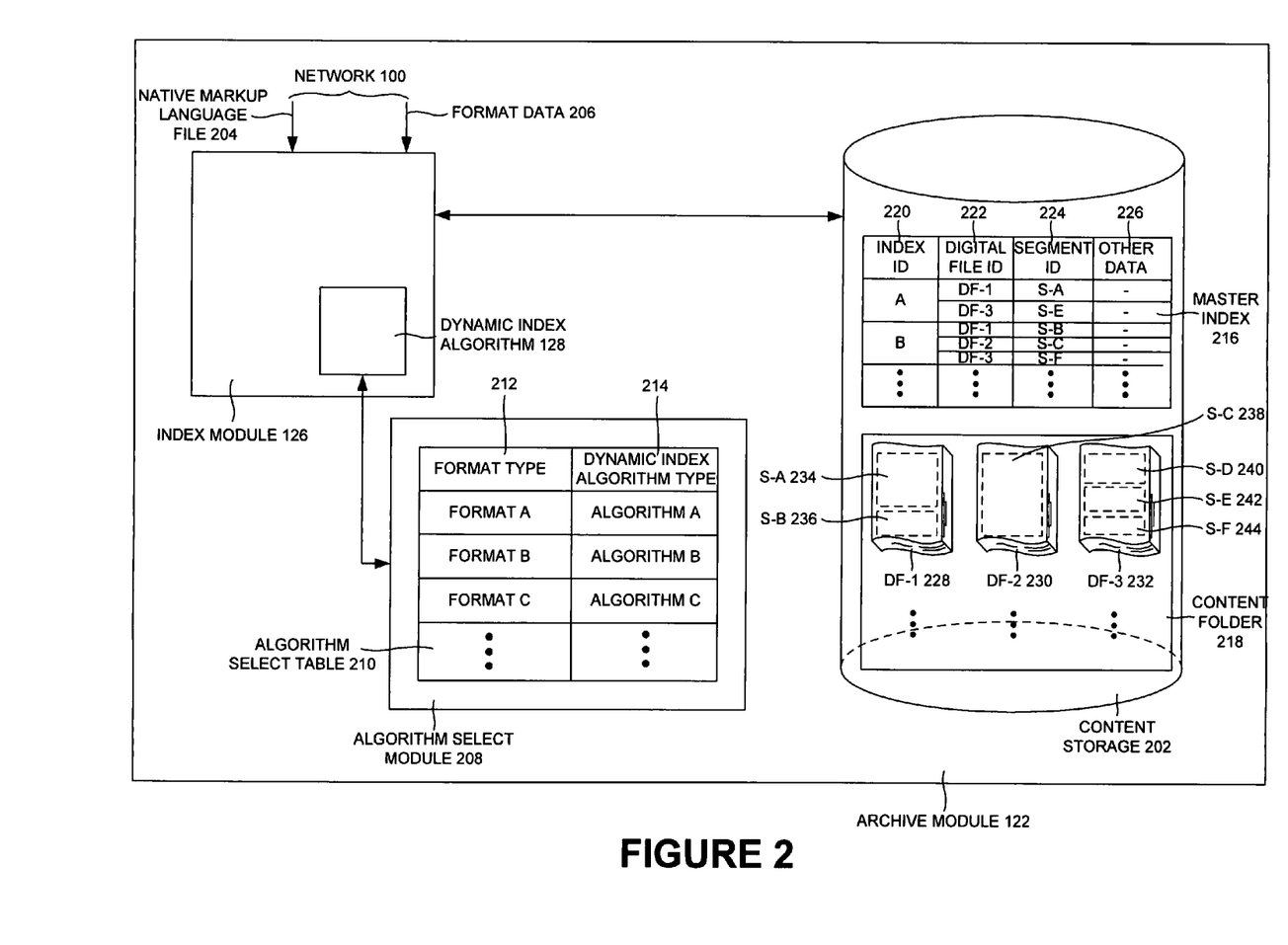
FIG. 2 is an exploded view of the archive module in FIG. 1, according to one embodiment.

The system also include a digital content module (e.g., the digital content module 120 of FIG. 1) to create (e.g., automatically and/or on the fly) a master index (e.g., the master index 216 of FIG. 3) when the one and/or more files are subdivided into multiple segments and then indexed using an algorithm (e.g., the dynamic index algorithm 128 as illustrated in FIG. 2) based on an indexing scheme (e.g., identifying key terms to be used in the master index) of a format data (e.g., the format data 206 of FIG. 2) associated with each one of the one and/or more files.

The system further includes a consent subscriber (e.g., a content subscriber 106 of FIG. 1) to generate a query data (e.g., the query data 136 of FIG. 1) to search for segments among the one and/or more files referenced by any index data of the master index matching the query data. The system then may process a compilation digital file (e.g., the compilation markup language file 132 of FIG. 1) generated in an access module of FIG. 4.

FIG. 1 is a system view of a content platform 104 connected to a content provider 102 and a content subscriber 106 through a network 100, according to one embodiment. Particularly, in FIG. 1 illustrates the content provider 102, the content platform 104, and the content subscriber 106, a conversion module 108, a format generator module 110, a copyright holder 112, a licensee 114, a document 116, a management module 118, a digital content module 120, an archive module 122, an access module 124, an index module 126, a dynamic index algorithm 128, a presentation module 130, a compilation markup language file 132, a query module 134, a query data 136, and a user 138.

The content provider 102 may be a workstation and/or a computer that processes (e.g., convert and/or transform to an electronic form) the document 116 of the copyright holder 112 and/or the licensee 114. The content platform 104 may be a server and/or a computer that process an electronic file of the document 116 to generate a list of indices. The content subscriber 106 may be a workstation and/or a computer that generates the query data 136. The conversion module 108 may be a software and/or a hardware embedded in the content provider 102 which converts the document 116 to an electronic file (e.g., a native markup language file 204 of FIG. 2).

The format generator module 110 (e.g., of the conversion module 108) may be a software and/or a hardware which generates a format data (e.g., a format data 206 of FIG. 2) in conjunction with the processing of the electronic file in the conversion module 108. The copyright holder 112 may be a person, an estate, a representative, etc. who holds a right to the document 116A (e.g., a novel, a textbook, a periodical, etc.). The licensee 114 may be a person, a business (e.g., a publisher, a distributor, etc.), and/or an educational institution who obtained a license to access the document. The document 116 (e.g., in a possession of the copyright holder 112 and/or the licensee 114) may be in an electronic form and/or in a non-electronic form where the non-electronic form may be converted to the electronic form as the document 116 is processed through the conversion module 108.

The management module 118 (e.g., of the content platform 104) may be a higher level software and/or hardware module which oversees an operation of the digital content module 120. The digital content module 120 (e.g., of the content platform 104) may be a database (e.g., native database) management program which creates a master index (e.g., the master index 216 of FIG. 2) through processing the document 116 in the electronic form (e.g., the native markup language file 204). The archive module 122 (e.g., of the digital content module 120) may be a software program and/or a hardware circuitry which processes the document 116 in the electronic form to generate a master index (e.g., the master index 216).

The access module 124 (e.g., of the digital content module 120) may be a search module in hardware/software which accesses the master index to compile segments of the document 116 (e.g., and/or documents). The index module 126 (e.g., of the archive module 122) may be a software and/or a hardware module which generate a plurality of index data when the electronic form of the document 116 is processed in the digital content module 120. The dynamic index algorithm 128 (e.g., embedded in the index module 126) may be a process and/or a method embedded in software and/or hardware which aids the index module 126 to generate the master index on the fly. The presentation module 130 (e.g., of the access module 124) may be a software and/or hardware component which generates the compilation markup language file 132 in a presentable manner. The compilation markup language file 132 (e.g., generated through the presentation module 130) may be a number of segments aggregated according to a subject matter of interest (e.g., determined by the query data 136).

The query module 134 (e.g., of the content subscriber 106) may be a software program and/or a hardware circuitry which generates the query data 136 (e.g., generated in the query module 134) based on a command data (e.g., to make an inquiry of certain key terms) of the copyright holder 112, the licensee 114, and/or the user 138. The query data 136 may be an encrypted data of a key term and/or key terms (e.g., in natural and/or artificial language) the user 138 may enter to generate the compilation makeup language file 132. The user 138 (e.g., licensed and/or unlicensed) may be a person and/or an institution (e.g., educational and/or commercial) which may subscribe to a digital content provided by the content platform 104.

For example, as illustrated in FIG. 1, the content provider 102 communicates with the copyright holder 112 and the licensee 114. The content provider 102 also communicates with the content platform 104 through the network 100. In addition, the content provider 102 interacts with the content subscriber 106 through the network 100 as illustrated in the embodiment of FIG. 1. The content platform 104 communicates with the content provider 102 and the content subscriber 106 through the network 100. The content subscriber 106 interacts with the user 138 who may communicate a signal data using a user device (e.g., a PDA, a cell phone, a computer, etc.) to generate the query data 136 (e.g., to access the master index in the content platform 104) and/or to obtain a license for a tiered access to the content platform 104.

Furthermore, a plurality of native markup language files (e.g., the native markup language file 204 of FIG. 2) individually described by a format data (e.g., the format data 206) may be communicated to a native database management program (e.g., the digital content module 120) generating a plurality of index data (e.g., of the master index 216) with each of the plurality of index data referencing at least one segment data of the native markup language files. Also, a compilation markup language file (e.g., the compilation markup language file 132) may be automatically provided through a content subscriber (e.g., the content subscriber 106) file aggregating multiple segment data when a query data (e.g., the query data 136) matches with at least one of the plurality of index data referencing the multiple segment data.

A plurality of documents (e.g., non-digital documents) of at least one of the copyright holder 112 and the licensee 114 may be processed in the content provider 102. The plurality of documents may be converted to the plurality of native markup language files (e.g., digital documents) using a conversion module (e.g., the conversion module 108). The format of each of the plurality of native markup language files may be generated using a format generator module (e.g., the format generator module 110).

The content provider 102 may provide a digital file (e.g., the compilation markup language file 132) based on multiple segments of a plurality of native markup language files (e.g., the native markup language file 204 of FIG. 2) communicated to a digital content module (e.g., the digital content module 120). The content platform 104 having the digital content module 120 may generate a plurality of index data referencing a plurality of segment data of the plurality of native markup language files using at least one on-the-fly indexing algorithm (e.g., the dynamic index algorithm 128) based on a format of each of the plurality of native markup language files. The content subscriber 106 coupled to the content platform 104 may process the digital file when the query data 136 of the content subscriber 106 matches with at least one of the plurality of index data referencing the multiple segments of the plurality of native markup language files.

At least one on-the-fly indexing algorithm may be based on a tagless indexing scheme which automatically creates index data (e.g., describing and locating segments of the native markup language file 204 of FIG. 2 being referenced by the index data) through linking segment data of the native markup language file 204 with the index data based on the format data 206. The dynamic index algorithm 128 may enable the content platform 104 to quickly create index data of a large volume of documents in a consistent manner (e.g., free from human errors in encrypting and/or labor cost).

The query data 136 may be generated in a query module 134 of the content subscriber 106 and process the digital file in the content subscriber 106 when a command data to retrieve the digital file associated with the query data 136 is communicated to the content subscriber 106. The management module 118 of the content platform 104 may provide a user (e.g., the user 138) with a layered access to the plurality of index data and the plurality of native markup language files when the content provider 102 communicates a privilege data of the user to the management module 118. A portable library device (e.g., with a flash drive) may be used to store the plurality of index files and the plurality of native markup language files when the user obtains a license from the copyright holder 112.

FIG. 2 is an exploded view of the archive module 122 in FIG. 1, according to one embodiment. Particularly, in FIG. 1 illustrates the content storage 202, the native markup language file 204, the format data 206, an algorithm select module 208, an algorithm select table, a format type 212, a dynamic index algorithm type 214, the master index 216, a content folder 218, an index ID 220, a digital file ID 222, a segment ID 224, an other data 226, a DF-1 228, a DF-2 230, a DF-3 232, a S-A 234, a S-B 236, a S-C 238, a S-D 240, a S-E 242, a S-F 244.

The content storage 202 may be a storage device (e.g., a hard drive and/or a computer memory) which stores the master index 216 and/or the content folder 218. The native markup language file 204 may be a digital file (e.g., without any metadata and/or with minimal metadata) converted from the document 116 (e.g., non-digital and/or non-electronic). The format data 206 may contain a structural information (e.g., an indexing scheme) of the document 116 which may be interpreted by the dynamic index algorithm 128 to generate the master index 216.

The algorithm select module 208 may retrieve a particular type of the dynamic index algorithm 128 through analyzing the format data 206. The algorithm select table 210 may be a database (e.g., a relational database) which links multiple types of the format data 206 with multiple types of the dynamic index algorithm 128. The format type 212 may categorize the format data 206 processed through the digital content module 120 of FIG. 1. The dynamic index algorithm type 214 may categorize the dynamic index algorithm 128 embedded in the index module 126. The master index 216 may be a comprehensive list of index data created in the archive module 122. The content folder 218 may hold multiple numbers of the native markup language file 204 processed in the digital content module 120. The index ID 220 may be used to identify an index data held in the master index 216. The digital file ID 222 may be used to identify a file referenced by the index data. The segment ID 224 may be used to identify a segment referenced by the index data. The other data 226 may be used to supplement a description of a segment data referenced by the index data. The DF-1 228, DF-2 230, and DF-3 232 may be a digital file (e.g., without having any metadata attached manually) stored in the content folder 218. The S-A 234, S-B 236, S-C 238, S-D 240, S-E 242, and S-F 244 may be a segment data which is referenced by an index data.

The content storage 202 may interact with the index module 126 of FIG. 1 to store a plurality of index data generated by the index module 126 to the master index 216. The index module 126 may process the native markup language file 204 and the format data 206 communicated from the content provider 102 through the network 100 to generate the plurality of index data. The dynamic index algorithm 128 may be selected using the algorithm select module 208 coupled to the index module 126. Moreover, the algorithm index table 210 may be embedded in the algorithm select module 208. The content folder 218 may be stored (e.g., separately from the master index 216) in the content folder 218.

For example, as illustrated in FIG. 2, the dynamic index algorithm 128 of the digital content module 120 may be fetched (e.g., through calling the dynamic index algorithm 128 which may be a software subroutine) when the native markup language file 204 and the format data 206 of the native markup language file 204 associated with the dynamic index algorithm 128 are processed in the digital content module 120. A plurality of index data referencing a plurality of segment data of the native markup language file 204 may be generated using the dynamic index algorithm 128. The plurality of index data and the native markup language file 204 may be stored in the digital content module 120.

In addition, the format data 206 may contain an indexing scheme of the native markup language file 204 where the indexing scheme may be entered directly from at least one of the copyright holder 112 of FIG. 1 and the licensee 114 and/or automatically generated by the format generator module 110. The dynamic index algorithm 128 may automatically link each of the plurality of segment data with at least one of the plurality of index data based on the indexing scheme. Furthermore, the master index 216 may be generated to streamline multiple ones of the plurality of index data when multiple ones of the native markup language file 204 are processed.

In one example embodiment, an index data having "A" as the index ID 220 may reference (e.g., describes and/or points to a location/address of) segments "S-A" 316 and "S-E" 324 of digital files "DF-1" 310 and "DF-3," 314 respectively. In another example embodiment, an index data having "B" as the index ID 220 may reference segments "S-B," 318 "S-C," 320 and "S-F" 326 of digital files "DF-1," 310 "DF-2," 312 and "DF-3" 314, respectively.

Figure 3:
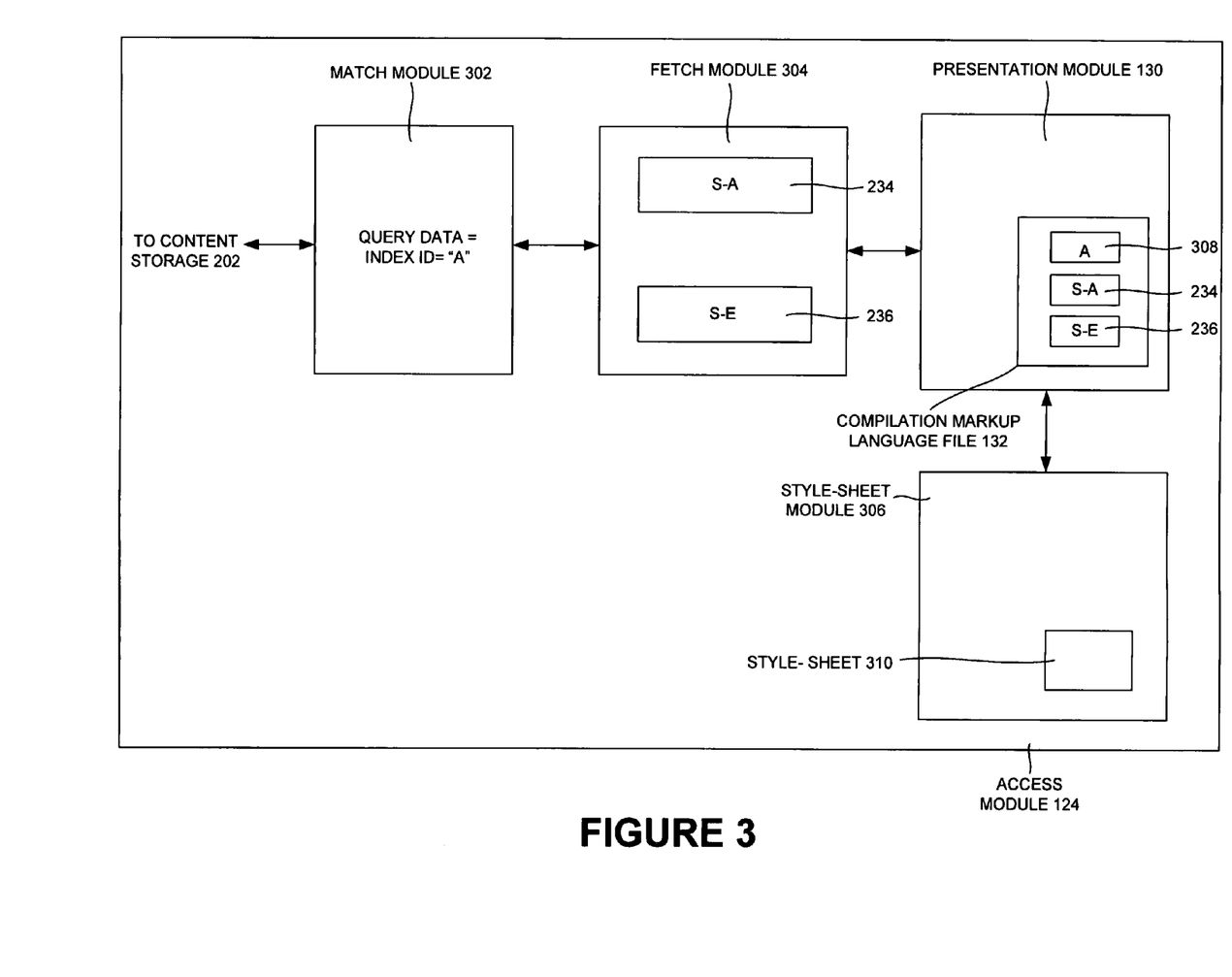
FIG. 3 is an exploded view of the access module of FIG. 1, according to one embodiment.

FIG. 3 is an exploded view of the access module 124 of FIG. 1, according to one embodiment. Particularly, in FIG. 3 illustrates a match module 302, a fetch module 304, a style-sheet module 306, "A" 308, and a style-sheet 310. The match module 302 may compare the query data 136 to each index data (e.g., where the index data contains a data describing a content of one and/or more segment data the query data 136 references to) of the master index 216. The fetch module 304 may fetch (e.g., copy and/or paste) a segment data when the query data 136 matches an index data of the master index 216 referencing the segment. "A" 308 may be the index ID 220 which references the segment ID S-A 234 and S-E 242. The style sheet module 306 may select the style-sheet 310 which suits a format of the compilation markup language file 132 of FIG. 1 generated in the presentation module 130. The style-sheet 310 may be a library module in a number of forms.

For example, as illustrated in FIG. 3, the match module 302 may communicate with the content storage 202 and the fetch module 304 when the query data 136 is processed in the match module 302. The fetch module 304 may interact with the presentation module 130 which may be linked to the style-sheet module 306.

Furthermore, at least one of the plurality of segment data may be accessed when the query data 136 generated by a user (e.g., the user 138) of the digital content module 120 matches with any one of the plurality of index data. The compilation markup language file 132 fetching multiple ones of the segment data based on the multiple ones of the native markup language file 204 may be generated when the query data 136 matches with any one of the multiple ones of the plurality of index data referencing the multiple ones of the segment data. The compilation markup language file 132 may be generated using the style-sheet 310 based on at least one format analysis of the multiple ones of the segment data of the compilation markup language file 132.

In one example embodiment, the match module 302 may generate a command data when the query data 136 matches with an index data having "A" as the Index ID 220. The fetch module 304 then may retrieve (e.g., copy and paste) segment data "S-A" 236 and "S-E" 242 referenced by "A." The presentation module 130 may proceed to generate the compilation markup language file 132 having "A" 308 as a header (e.g., displaying a theme) of the compilation markup language file 132 and segment data "S-A" 236 and "S-E" 242 as a content (e.g., information) of the compilation markup language file 132. The presentation module 130 may communicate with the style-sheet module 306 to present the compilation markup language file 132 in a layout (e.g., a textbook style, a legal document style, etc.) suitable for each of the segment data.

FIG. 4 is an exploded view of the management module 118 of FIG. 1, according to one embodiment. Particularly, FIG. 4 illustrates a configuration module 402, a privilege module 404, an analysis module 406, a security module 408, an ecommerce module 410, an other module 412, and a privilege table 414. The configuration module 402 may help manage a configuration of modules (e.g., the privilege module 404, the analysis module 406, the security module 408, the ecommerce module 410 and/or other module 412) in the content platform 104 through administrating system settings such as setting properties to enable the modules.

Figure 5:
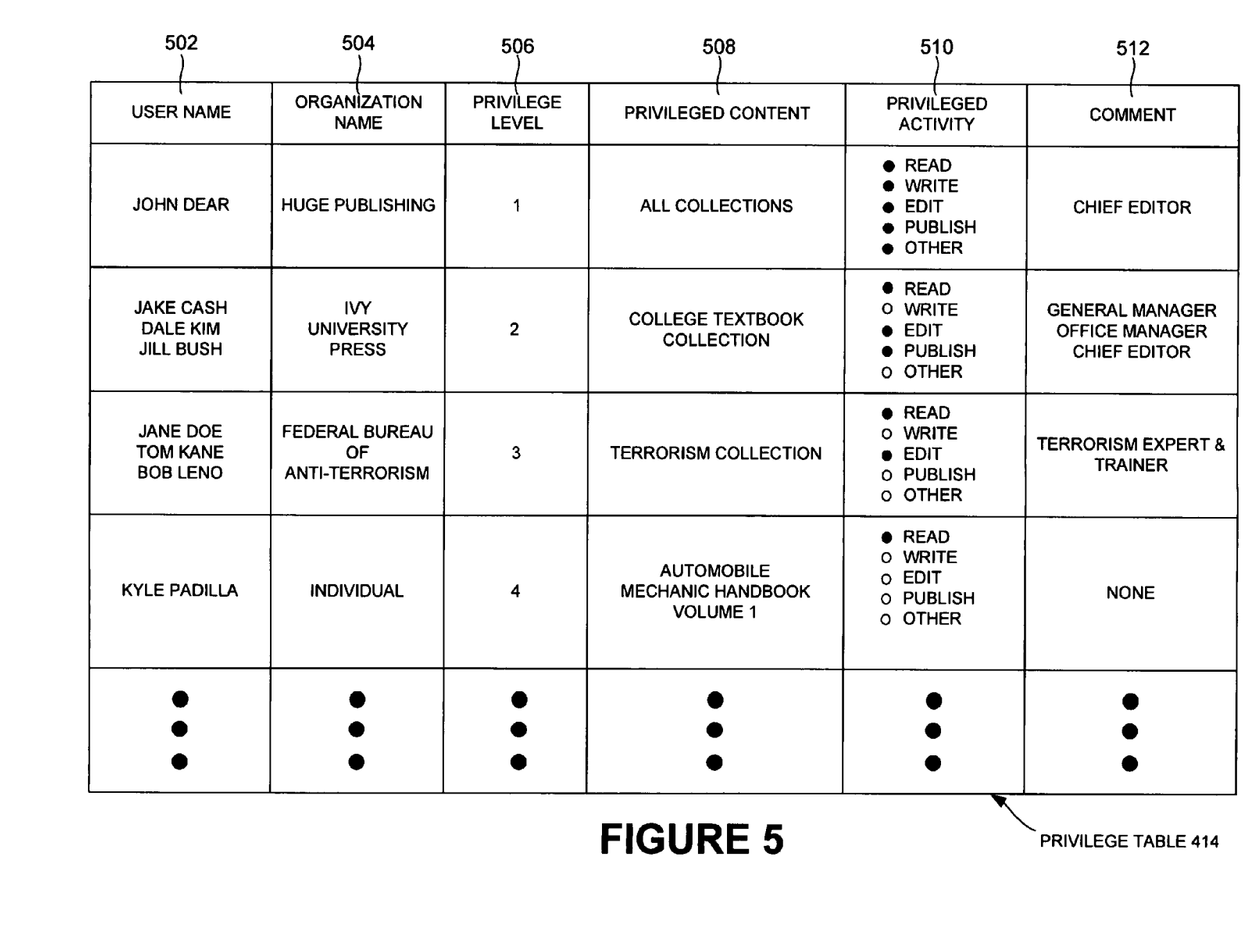
FIG. 5 is a table view of the privilege table of FIG. 4 in the privilege module of FIG. 4, according to one embodiment.
Figure 6:
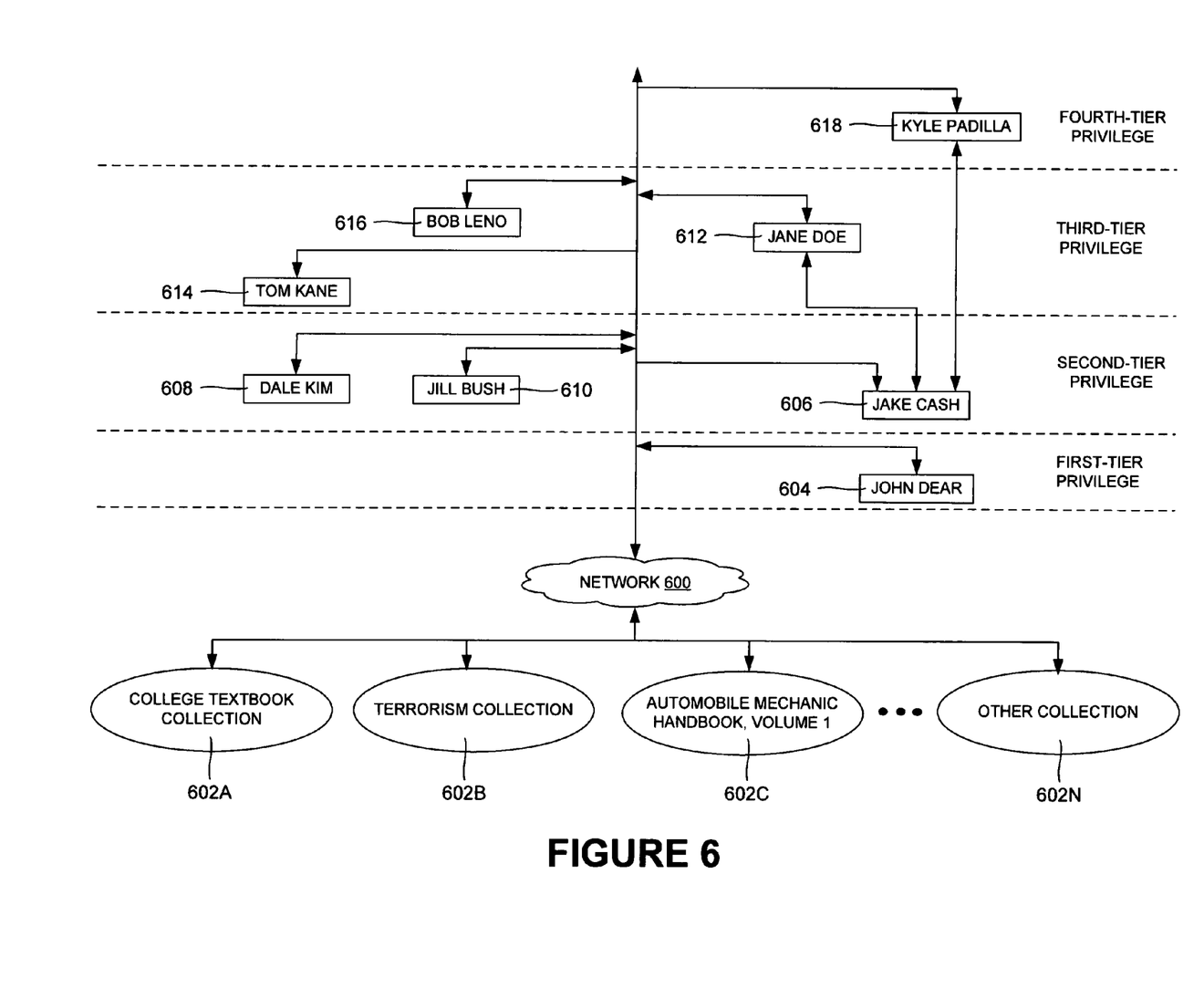
FIG. 6 is a tree diagram showing different tiers of privileges in regard to accessing the content platform of FIG. 1, according to one embodiment.

The privilege module 404 having a privilege table 414 may control an access to the digital content module 120 of FIG. 1 through assigning (e.g., licensing) a privilege (e.g., in multiple tiers) to a user of the digital content module 120, as will be illustrated in details in FIG. 5 and FIG. 6. The privilege module 404 may allow a user (e.g., the user 138) with the access to the master index 216 and native markup language files referenced by the master index 216 when the content provider 102 communicates a privilege data of the user (e.g., once a license is obtained by the user's request) to the management module 118.

The analysis module 406 may perform a number of reporting services (e.g., a report on portal access where the digital content is accessed, a usage report on various embodiments of the content platform 104, a report on traction on an individual digital content, a report on individual customer group, a system abuse report, etc.). Based on an analysis of the reports processed in the analysis module 406, an online delivery platform (e.g., comprising the content provider 102, the content platform 104, and the content subscriber 106) may be able to develop a better digital content to offer to clients of the online delivery platform.

The security module 408 may be used to support a digital certificate of a user of the online delivery platform when the user obtains a license to use the online delivery platform. The security module also may employ a cryptographic data protection as needed where the online delivery platform supports a light weight directory access protocol (LDAP) and Microsoft®'s active directory (AD). The security module 408 may also audit logging on data of the online delivery platform.

The ecommerce module 410 may be used to monetize digital contents (e.g., which may include a collection of native markup language files and a list of indices which reference segments of the collection) when multiple realizations of the digital contents are commercially offered to clients. The other module 412 may be used to supplement other features of the management module 118. The privilege table may be a database (e.g., a relational database) which holds information of a client (e.g., the copyright holder 112, the licensee 114, and/or the user 138) of the online delivery platform. Furthermore, an access to the digital content module 120 may be controlled via assigning one of layered privileges to a user of the digital content module 120.

FIG. 5 is a table view of the privilege table 414 of FIG. 4 in the privilege module 404 of FIG. 4, according to one embodiment. Particularly, FIG. 5 illustrates a user name 502, an organization name 504, a privilege level 506, a privileged content 508, a privileged activity 510, and/or a comment 512. The user name 502 may list a name of a client (e.g., the copyright holder 112, the licensee 114, and/or the user 138) to an online delivery platform (e.g., which includes the content provider 102, the content platform 104, and/or the content subscriber 106). The organization name 504 may list a name of an organization where the user belongs to.

The privilege level 506 may list a type of a license the user has obtained in accessing the online delivery platform. There may be multiple tiers in the privilege level 506 (e.g., where four levels may be an option as illustrated in FIG. 5). The privileged content 508 may restrict the user to a limited volume of native markup language files and index data (e.g., referencing segment data of the native markup language files) that may be accessible by the user. The privileged activity 510 may list a number of options (e.g., read, write, edit, publish, and/or other) the user can exercise in regard to the native markup language files and the index data. The comment 512 may list a remark about the user, such as the user's position in the user's company.

FIG. 6 is a tree diagram showing different tiers of privileges in regard to accessing the content platform 104 of FIG. 1, according to one embodiment. Particularly, FIG. 6 illustrates a plurality of clients (e.g., John Dear 604, Jake Cash 606, Dale Kim 608, Jill Bush 610, Jane Doe 612, Tom Kane 614, Bob Leno 616, and Kyle Padilla 618) who have one of a four-tiered access to a digital content (e.g., the college textbook collection 602A, the terrorism collection 602B, the automobile mechanic handbook, volume 1 602C, and other collection 602N) through a network 600.

In one example embodiment, John Dear 604 as a first-tier privilege holder may have an access to a read, write, edit, publish, and/or other privilege (e.g., sublicense, etc.) for all collections 602 (e.g., collections encompassing all native markup language files in the content platform 104 of FIG. 1) of the online delivery platform. Jake Cash 606, Dale Kim 608, and Jill Bush 610 from Ivy University Press which holds a second-tier privilege may have an access to a read, edit, and publish privilege for a college textbook collection 602A through the network 600.

Jane Doe 612, Tom Kane 614, and Bob Leno 616 who hold a third-tier privilege through Federal Bureau of Anti-Terrorism may have an access to a read and edit privilege for a terrorism collection 602B (e.g., a collection of segment data from the native markup language files on a subject area of terrorism). Lastly, Kyle Padilla 618 may have an access to a read privilege only for an automobile mechanic handbook, volume 1. Thus, Kyle Padilla 618 may be only allowed to query whether the online delivery platform possesses a digital content he is looking for. Once Kyle Padilla 618 learns an existence of the digital content he is looking for, he may be able to license the digital content from the content provider 102.

In another example embodiment, Jake Cash 606, who holds the second-tier privilege (e.g., which allows him to edit and/or publish the college textbook collection 602A), may be able to compile a book on a certain subject and offer the book to Kyle Padilla 618, who holds the fourth-tier privilege. In another example embodiment, Jake Cash 606 may be able to offer the book to Jane Doe 612 who may be in need of such a book.

Furthermore, a portal focusing on a specific subject (e.g., American Revolutionary War, 19$^{th}$ Century American politicians, etc.) may be offered based on multiple segment data generated in the content platform 104 (e.g., to create a traction of internet users). A host of the portal may be able to monetize it by soliciting banner advertisements with a client base obtained thanks to the digital content.

In addition, multiple ones of the portal focusing on the specific subject (e.g., where each portal may have a unique set of digital content) may be integrated to build a universal portal (e.g., which may encompass a wide array of subject areas where a user accessing the universal portal may be able to process a vast volume of information). An on-line delivery content (e.g., to a website, a television, a portable communication device, etc.) based on the master index 216 and the multiple ones of the native markup language file 204 may be generated (e.g., catering to users of the digital content module 120 of FIG. 1). The digital content may be offered for sale (e.g., sold as a collection of e-books and/or as a library in its entirety or partially). The digital content sold may be only used for the user's own purpose and/or the user may use the digital content to create the user's own compilation collections (e.g., to be sold to other users with a permission of a copyright holder).

Figure 7:
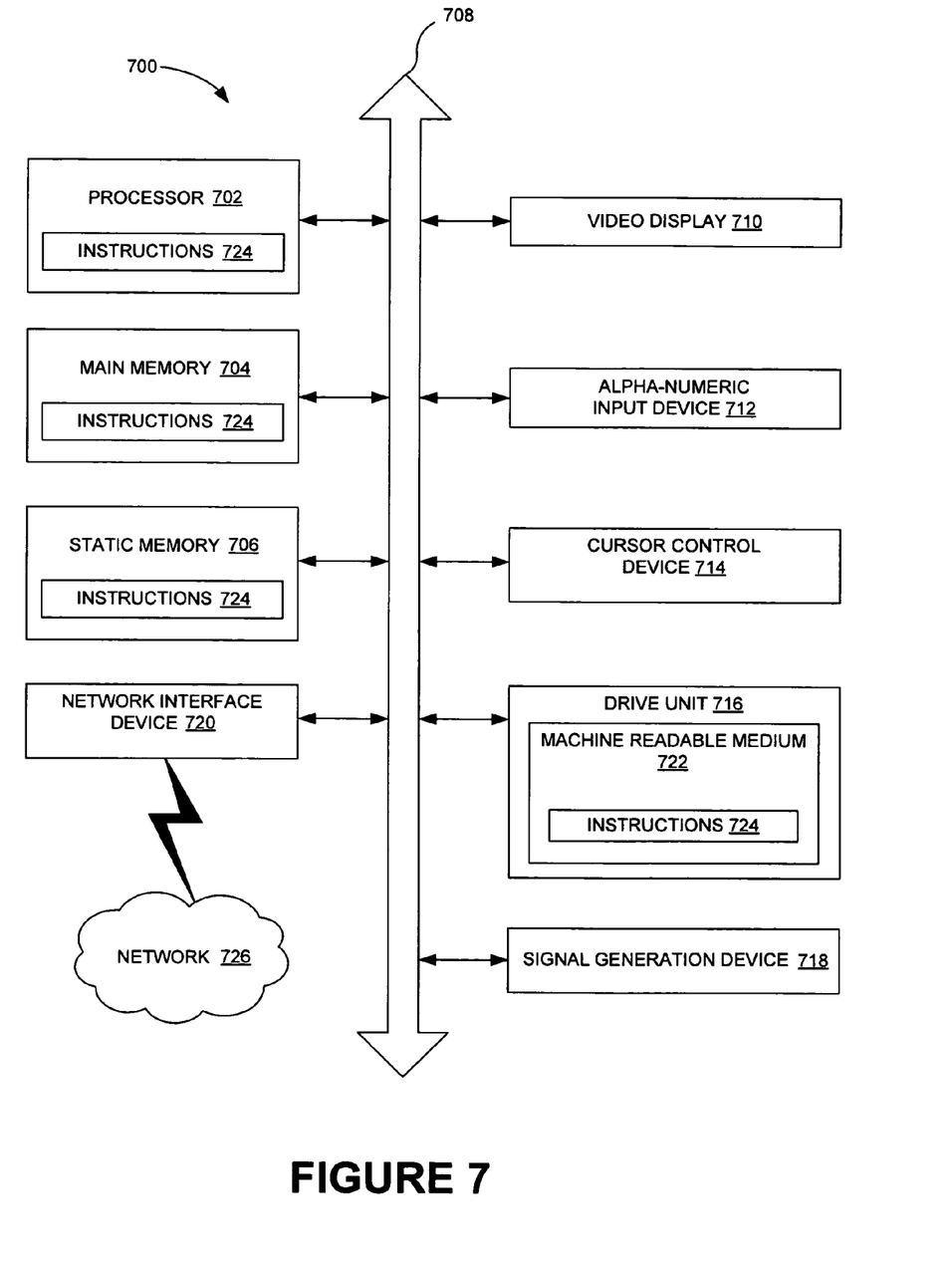
FIG. 7 is a diagrammatic representation of a data processing system of the content provider, the content platform, and/or the content subscriber of FIG. 1 capable of processing a set of instructions to perform one or more of methodologies described herein, according to one embodiment.

FIG. 7 is a diagrammatic representation of a data processing system of the content provider 102, the content platform 104, and/or the content subscriber 106 of FIG. 1 capable of processing a set of instructions to perform one or more of methodologies described herein, according to one embodiment. In various embodiments, the data processing system operates as a standalone device and/or may be connected (e.g., networked through the network 726) to other machines. In a network deployment, the data processing system may operate as a workstation (e.g., to provide a graphic user interface) which connects to the content provider 102, the content platform 104 and/or the content subscriber 106 of FIG. 1 directly and/or via the network 726. The data processing system may be any one or any collection of a personal computer (PC), a tablet PC, a set-top box (STB), a personal digital assistant (PDA), a cellular telephone, a web appliance, a network router, a switch and/or a bridge, an embedded system, and/or any machine capable of executing a set of instructions (sequential and/or otherwise) that specify actions to be taken by the machine.

One example of the data processing system may include a processor 702 (e.g., a central processing unit (CPU) or the CPU and a graphics processing unit (GPU)), a main memory 704, and a static memory 706, which communicate to each other via a bus 708. The data processing system may further include a video display unit 710 (e.g., a liquid crystal display (LCD) and/or a cathode ray tube (CRT)), an alpha-numeric input device 712 (e.g., a keyboard), a cursor control device 714 (e.g., a mouse), a drive unit 716, a signal generation device 718 (e.g., a speaker), and a network interface device 720.

The drive unit 716 may include a machine-readable medium 724 on which is stored one or more sets of instructions (e.g., instruction 722) embodying any one or more of the methodologies and/or functions described herein. The instruction 722 may also reside, completely and/or at least partially, within the main memory 704 and/or within the processor 702 during the execution thereof by the data processing system, wherein the main memory 704 and the processor 702 may also constitute machine-readable media.

The instruction 722 may further be transmitted and/or received over the network 100 via the network interface device 720. While the machine-readable medium 724 is shown in an example embodiment to be a single medium, the term "machine-readable medium" should be taken to include a single medium and/or multiple media (e.g., a centralized and/or distributed database, and/or associated caches and servers) that store the one or more sets of instructions. The term "machine-readable medium" should also be taken to include any medium that is capable of storing, encoding, and/or carrying a set of instructions for execution by the machine and that causes the machine to perform any one or more of the methodologies of the various embodiments. The "machine-readable medium" shall accordingly be taken to include, but not limited to, solid-state memories, optical and magnetic media, and carrier wave signals.

Figure 8:
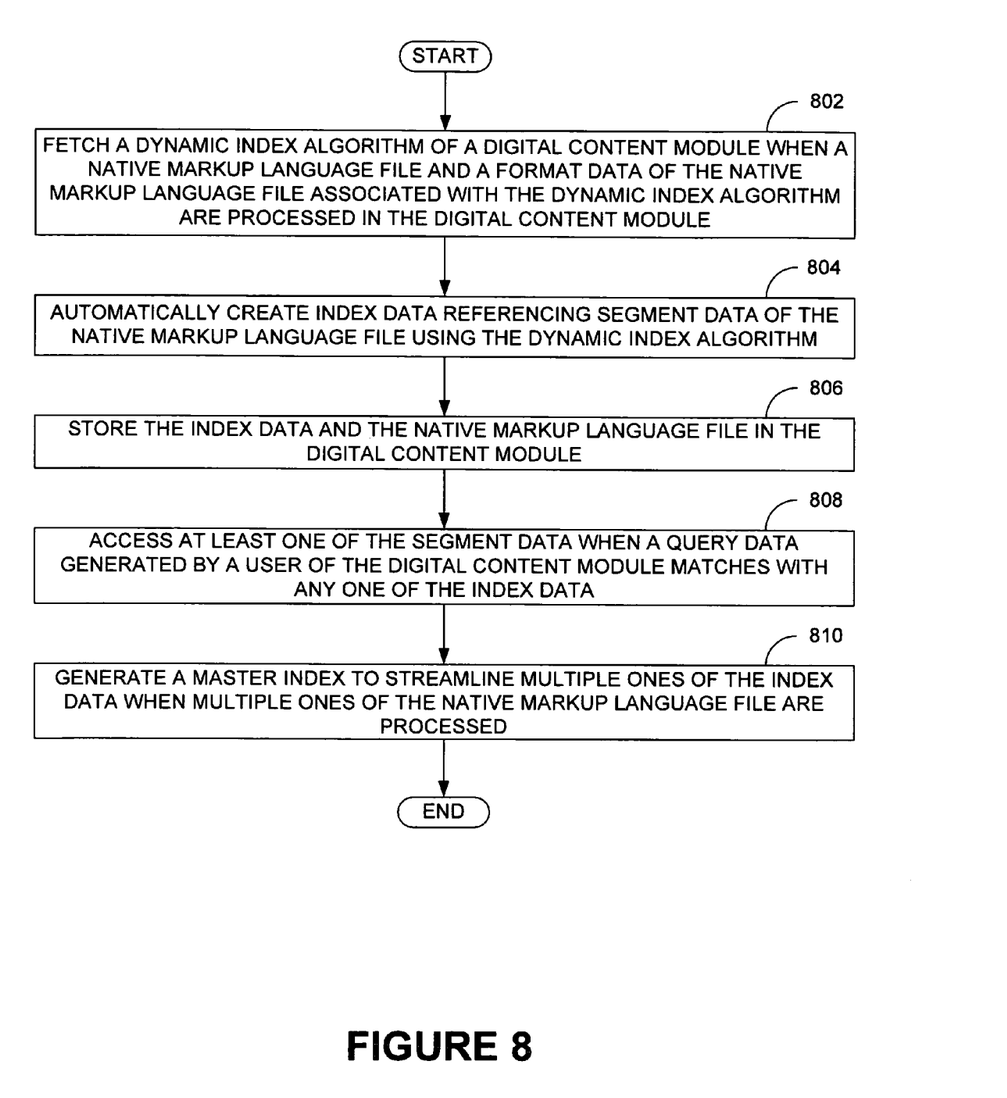
FIG. 8 is a process flow of creating and accessing the master index of FIG. 2, according to one embodiment.

FIG. 8 is a process flow of creating and accessing a master index (e.g., the master index 216 of FIG. 2), according to one embodiment. In operation 802, a dynamic index algorithm (e.g., the dynamic index algorithm 128 of FIG. 1) of a digital content module (e.g., the digital content module 120) may be fetched when a native markup language file (e.g., the native markup language file 204 of FIG. 2) and a format data (e.g., the format data 206) of the native markup language associated with the dynamic index algorithm are processed in the digital content module.

In operation 804, index data referencing segment data of the native markup language file may be automatically created using the dynamic index algorithm. The index data and the native markup language file may be stored in the digital content module (e.g., the content storage 202 of FIG. 2) in operation 806. Then in operation 808, at least one of the segment data may be accessed when a query data (e.g., the query data 136 of FIG. 1) generated by a user of the digital content module matches with any one of the index data. In operation 810, a master index (e.g., the master index 216) may be generated to streamline multiple ones of the index data when multiple ones of the native markup language file are processed.

Figure 9:
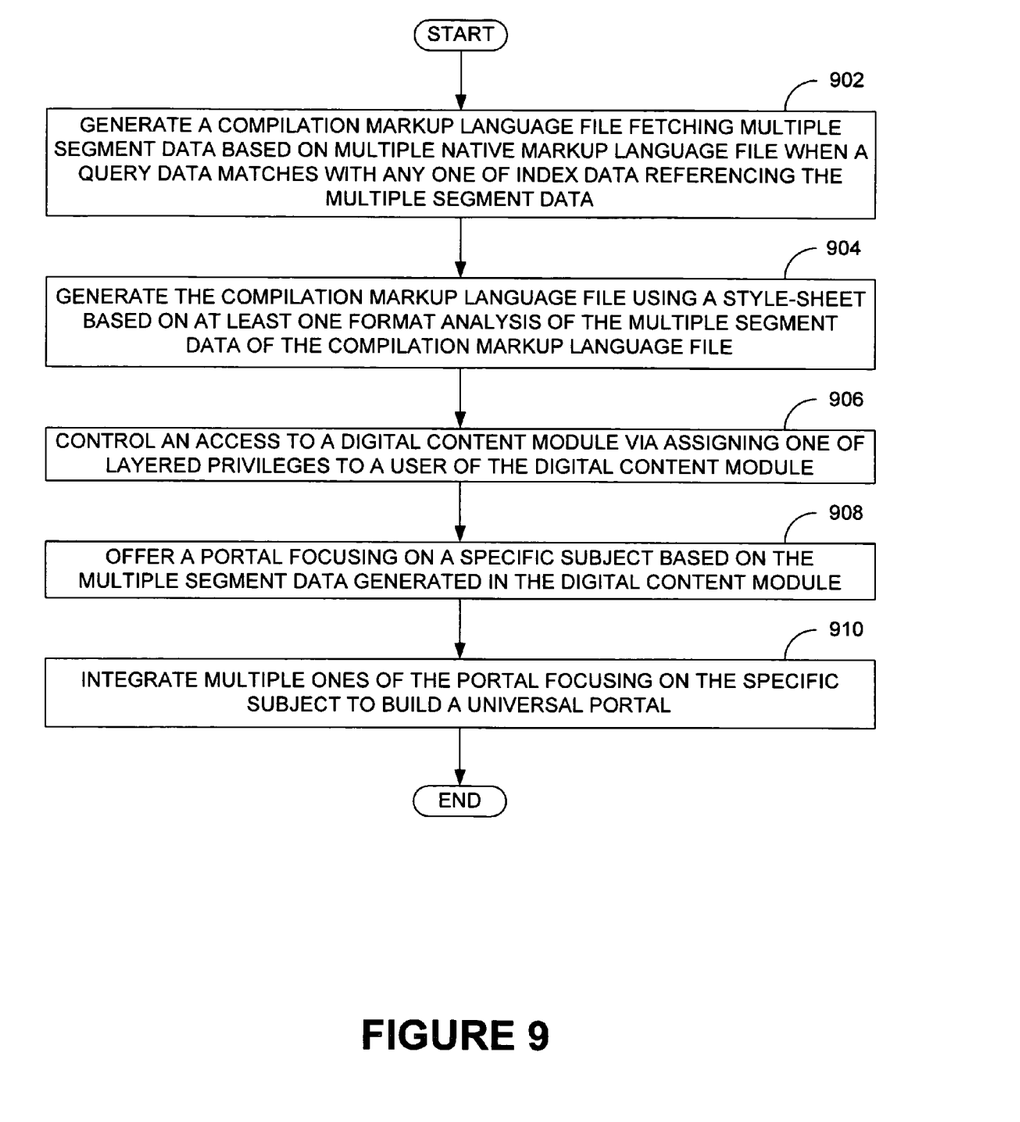
FIG. 9 is a process flow of generating the compilation markup language file of FIG. 1 and controlling an access to the digital content module, according to one embodiment.

FIG. 9 is a process flow of generating a compilation markup language file (e.g., the compilation markup language file 132 of FIG. 1) and controlling an access to a digital content module (e.g., the digital content module 120 of FIG. 1), according to one embodiment. In operation 902, the compilation markup language file may be generated fetching multiple segment data based on multiple native markup language files when a query data (e.g., the query data 136) matches with any one of index data referencing the multiple segment data. In operation 904, the compilation markup language file may be generated using a style-sheet (e.g., the style-sheet 310 of FIG. 3) based on at least one format analysis (e.g., performed using the style-sheet module 306) of the multiple segment data of the compilation markup language file.

An access to a digital content module (e.g., the digital content module 120 of FIG. 1) may be controlled in operation 906 via assigning one of layered privileges to a user of the digital content module. In operation 908, a portal focusing on a specific subject (e.g., politics, sports, history, entertainment, etc.) based on the multiple segment data generated by the digital content module may be offered to viewers (e.g., of the portal). In operation 910, multiple portals each focusing on a specific subject may be integrated (e.g., through interfacing the multiple portals through a network) to build a universal portal (e.g., covering a wide array of topics).

Figure 10:
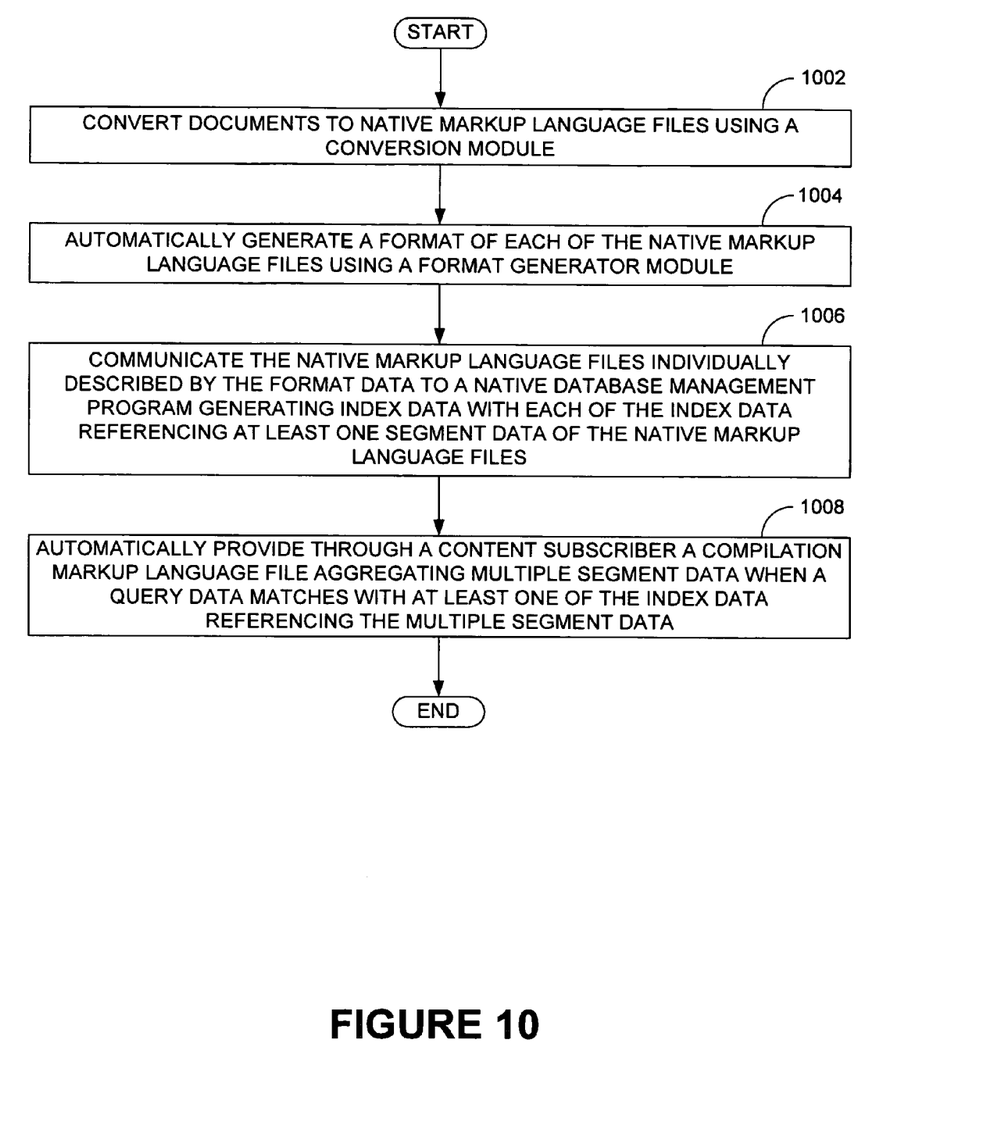
FIG. 10 is a process flow of providing the compilation markup language file of FIG. 1 through the content subscriber, according to one embodiment.

FIG. 10 is a process flow of providing a compilation markup language file (e.g., the compilation markup language file 132 of FIG. 1) through a content subscriber (e.g., the content subscriber 106), according to one embodiment. In operation 1002, documents (e.g., in a non-digital format) may be converted to native markup language files (e.g., in a Doc-Book format, a native XML format, etc.) using the conversion module (e.g., the conversion module 108 of FIG. 1). In operation 1004, a format (e.g., an outline indicating an indexing scheme of each of the native markup language files) of each of the native markup language files may be automatically generated using a format generator module (e.g., the format generator module 110).

The native markup language files individually described by the format data (e.g., the format data 206 of FIG. 2) may be communicated in operation 1006 to a native database management program (e.g., the digital content module 120 of FIG. 1) generating index data with each of the index data referencing at least one segment data of the native markup language files. In operation 1008, a compilation markup language file (e.g., the compilation markup language file 132 of FIG. 1) aggregating multiple segment data may be automatically provided through a content subscriber (e.g., the content subscriber 106) when a query data (e.g., the query data 136) matches with at least one of the index data referencing the multiple segment data.

In one example embodiment, a publishing company such as McGraw Hill® may use an online delivery platform to compile and/or publish digital contents based on works of authorship which may be in a digital and/or non-digital form. On the one hand, the online delivery platform (e.g., of software and/or hardware modules) may first convert non-digital files (e.g., of legacy work) into native XML files and/or Doc-Book files, create a list of indices using an indexing scheme based on criteria of the publishing company, and/or access the native XML files and/or the DocBook files using the list of indices.

Through the online delivery platform, the publishing company may be able to provide clients a digital version of an original work. In addition, the publishing company may be able to aggregate some segments of the native XML files and/or the DocBook files to create a compilation work. Furthermore, the publishing company may be able to provide some of their clients such as educational and/or business institutions a part or a whole of its digital content, which includes the XML files and/or the DocBook files, and/or the list of indices.

The online delivery platform may be sold and/or licensed to the publishing company as an application software (e.g., a database management program). Alternatively, the online delivery platform may be a service provider which offers copyright holders, and/or other licensees, such as the publishing company, a means to index their work of authorship (e.g., in electronic and/or non-electronic form) for later uses, such as a compiled e-book, an online course, an online portal, etc.

In another example embodiment, a client of the work of authorship may obtain a partial and/or full license to access the work of authorship in an indexed digital form. The client may be able to publish a compiled work based on the work of authorship depending on a type of the license the client holds. The copyright holders and/or other licensees may be able to monetize the work of authorship based on their licensing schemes. In yet another example embodiment, the work of authorship in digital form may be stored and/or communicated to a portable storage (e.g., such as a flash memory) and offered as a digital library.

Although the present embodiments have been described with reference to specific example embodiments, it will be evident that various modifications and changes may be made to these embodiments without departing from the broader spirit and scope of the various embodiments. For example, the conversion module 108, the format generator module 110, the management module 118, the digital content module 120, the archive module 122, the access module 124, the index module 126, the dynamic index algorithm 128, the presentation module 130, and/or the compilation markup language file 132 of FIG. 1, the algorithm select module 208 of FIG. 2, the match module 302, the fetch module 304, and/or the style-sheet module 306 of FIG. 3, the configuration module 402, the privilege module 404, the analysis module 406, the security module 408, the ecommerce module 410, and/or the other module 412 of FIG. 4, described herein may be enabled and operated using hardware circuitry (e.g., CMOS based logic circuitry), firmware, software and/or any combination of hardware, firmware, and/or software (e.g., embodied in a machine readable medium).

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of a content platform, comprising:
   converting multiple non-digital documents to create a compiled digital document to electronic files in a native form;
   fetching a dynamic index algorithm of a digital content module when a native markup language file and a format data of the native markup language file associated with the dynamic index algorithm are processed in the digital content module;
   automatically creating a plurality of index data referencing a plurality of segment data of the native markup language file using the dynamic index algorithm;
   storing the plurality of index data and the native markup language file in the digital content module;
   accessing at least one of the plurality of segment data when a query data generated by a user of the digital content module matches with any one of the plurality of index data, wherein the format data to contain an indexing scheme of the native markup language file, wherein the dynamic index algorithm to automatically link each of the plurality of segment data with at least one of the plurality of index data based on the indexing scheme,
   generating a master index to streamline multiple ones of the plurality of index data when multiple ones of the native markup language file are processed;
   generating a compilation markup language file fetching multiple ones of the plurality of segment data based on the multiple ones of the native markup language file when the query data matches with any one of the multiple ones of the plurality of index data referencing the multiple ones of the plurality of segment data;
   generating the compilation markup language file using a style-sheet based on at least one format analysis of the multiple ones of the plurality of segment data of the compilation markup language file;

controlling an access to the digital content module via assigning one of layered privileges to the user of the digital content module;

offering a portal focusing on a specific subject based on the multiple ones of the plurality of segment data generated in the content platform;

integrating multiple ones of the portal focusing on the specific subject to build a universal portal; and generating an on-line delivery content based on the master index and the multiple ones of the native markup language file, wherein a form of a machine-readable medium embodying a set of instructions that, when executed by a machine, causes the machine to perform the method.

2. A method of a content provider, comprising:

communicating a plurality of native markup language files individually described by a format data to a native database management program generating a plurality of index data with each of the plurality of index data referencing at least one segment data of the native markup language files;

automatically providing through a content subscriber a compilation markup language file aggregating multiple segment data when a query data matches with at least one of the plurality of index data referencing the multiple segment data;

processing a plurality of documents of at least one of a copyright holder and a licensee;

converting the plurality of documents to the plurality of native markup language files using a conversion module; and automatically generating a format of each of the plurality of native markup language files using a format generator module.

3. A system, comprising:

a content provider to provide a digital file based on multiple segments of a plurality of native markup language files communicated to a digital content module;

a content platform having the digital content module to generate a plurality of index data referencing a plurality of segment data of the plurality of native markup language files using at least one on-the-fly indexing algorithm based on a format of each of the plurality of native markup language files; and a content subscriber coupled to the content platform to process the digital file when a query data of the content subscriber matches with at least one of the plurality of index data referencing the multiple segments of the plurality of native markup language files wherein the index data is a list of markup language files, wherein the at least one on-the-fly indexing algorithm is based on a tagless indexing scheme, wherein the content subscriber to generate the query data in a query module of the content subscriber and process the digital file in the content subscriber when a command data to retrieve the digital file associated with the query data is communicated to the content subscriber, wherein a management module of the content platform to provide a user with a layered access to the plurality of index data and the plurality of native markup language files when the content provider communicates a privilege data of the user to the management module, wherein a portable library device to store the plurality of index files and the plurality of native markup language files when the user obtains a license from a copyright holder of the plurality of native markup language files.

* * * * *